US005612960A

United States Patent [19]
Stevens et al.

[11] Patent Number: 5,612,960
[45] Date of Patent: Mar. 18, 1997

[54] RADIO LAN STATION WITH IMPROVED POINT-TO-POINT LINK DIAGNOSTIC CAPABILITY AND METHOD OF OPERATION THEREOF

[75] Inventors: Henricus J. M. Stevens, Veenendaal; Adrianus C. van der Kuil, Utrecht, both of Netherlands

[73] Assignee: NCR Corporation, Dayton, Ohio

[21] Appl. No.: 810,749

[22] Filed: Dec. 20, 1991

[51] Int. Cl.$^6$ .................................................... G01R 31/28
[52] U.S. Cl. ............................................................ 371/20.1
[58] Field of Search .................................. 371/20.1, 20.4, 371/20.5, 68.2; 379/5; 370/15

[56] References Cited

U.S. PATENT DOCUMENTS

| | | | |
|---|---|---|---|
| 4,680,581 | 7/1987 | Kozlik et al. | 340/825.06 |
| 5,005,172 | 4/1991 | Kawamoto | 371/18 |
| 5,220,564 | 6/1993 | Tuch et al. | 370/94.1 |

*Primary Examiner*—Robert W. Beausoliel, Jr.
*Assistant Examiner*—Stephen C. Elmore
*Attorney, Agent, or Firm*—James M. Stover

[57] ABSTRACT

A wireless radio local area network is provided including a host station and one or more remote stations. When a diagnostic link is established between two stations in the network, diagnostic information with respect to the integrity of the link is collected. Each of the network stations engaging in diagnostic activity transmits a special diagnostic frame including a diagnostic network identification designator (NWID) code to the other stations in the network. For example, the host station transmits a diagnostic frame including the diagnostic NWID code. The host station then listens for other remote stations with the same diagnostic NWID code to transmit their diagnostic frames. The host station, which is the receiving station in this example, is capable of determining if any of the received diagnostic frames from the other remote stations exhibit the same diagnostic NWID code as the host station. The host station monitors the signal quality of those diagnostic frames received from a particular other remote station which are determined to exhibit the same NWID code as the diagnostic frames transmitted by the host station. Each station in the LAN is desirably equipped with the described diagnostics/ signal quality monitoring capability. In this manner, signal quality information with respect to the radio link formed between a particular remote station and a station such as the host station is derived.

24 Claims, 5 Drawing Sheets

RADIO LAN STATION WITH IMPROVED POINT-TO-POINT LINK DIAGNOSTIC CAPABILITY AND METHOD OF OPERATION THEREOF

This invention relates in general to Local Area Networks (LANs) and, more particularly, to radio LANs which link a plurality of network stations by wireless radio communication links.

BACKGROUND OF THE INVENTION

Conventional wire-based LAN systems employ extensive fixed cabling to interconnect the multiple stations which form the networked system. The installation of such fixed cabling is difficult enough when performed concurrently with new building construction and is even more problematic when an existing structure must be retrofitted. In the resultant LAN using fixed cabling, the networked stations are constrained to installation at fixed locations which are dependent on such cabling.

To address these concerns and limitations, radio LANs have been developed which utilize wireless radio links rather than cable to interconnect the network stations. Unfortunately, radio based LANs encounter another set of problems unique to the indoor radio environment. For example, radio LANs are susceptible to multi-path fading which can interfere with inter-station communication.

FIG. 1 shows a conventional radio LAN including stations 1, 2, 3 ... N which are interconnected by a radio link. These stations each include radio transmitting and radio receiving portions (not shown). A LAN station typically transmits information in frames such as frame 10 shown in FIG. 2. Frame 10 includes a preamble 12, a start delimiter 14 designated SD, a network identification designator number 16 (NWID), user data 18, and an end delimiter 20 designated ED. In the radio LAN environment, there is a need for synchronization during the reception of the frame in order to recover the user data. To facilitate such synchronization, the start delimiter SD is transmitted preceding the synchronization sensitive part of the frame. More specifically, symbol synchronization is required to receive the network identification number NWID and user data.

In a radio LAN environment, the transmitted frames can be received within a predetermined area around the transmitting station by any station using the same carrier frequency and the same modulation type. The use of NWID's makes the logical isolation of two or more LAN's possible on a physical level. In the case of overlapping and partially overlapping LAN's, the transmission medium can be effectively shared by using such NWID's. In this manner, the transmissions of the respective LAN's can be distinguished from one another.

In order for the respective stations in the radio LAN to maintain synchronization and to communicate reliably, it is required that relatively high quality radio communication links be maintained among the various stations of the network. For diagnostic purposes, it is desirable that a particular LAN station be able to analyze the conditions of transmission and reception between the particular LAN station and another station in the LAN. The quality of transmission and reception over a particular radio frequency (RF) path which forms the communication link is determined by several factors. For example, the presence of RF barriers such as wall and floors affect the integrity of the radio link. Delay spread distortion by reflections also affects signal quality over the link. Moreover, signal level and quality, hereinafter "link quality", is affected by antenna placement and the presence of interfering sources on the same radio frequency as employed by the link. For these reasons, measurement of RF path conditions between stations in the LAN is important to permit an assessment of the quality of wireless communications within the LAN.

SUMMARY OF THE INVENTION

Accordingly, one object of the present invention is to provide a radio LAN station which is capable of assessing the quality of the radio communication links between such station and other radio LAN stations.

Another object of the present invention is to provide a radio local area network which is capable of measuring link quality between stations therein without interrupting regular LAN communications.

In accordance with the present invention, a host radio LAN station is provided which includes a transmitter for transmitting diagnostic frames including a diagnostic network identification designator (NWID) code to remote stations which are remote from the host station. The host station also includes a receiver for receiving diagnostic frames from the remote stations. The host station further includes a determining circuit, coupled to the receiver, for determining if any of the diagnostic frames received from the remote stations exhibits the same diagnostic NWID code as the host station. The host station also includes a monitoring circuit, coupled to the receiver, for monitoring the link quality of those diagnostic frames received from a particular remote station which are determined by the determining circuit to exhibit the same diagnostic NWID code as the diagnostic frames transmitted by the host station. The monitoring circuit thus derives link quality information with respect to the radio link formed between the particular remote station and the host station.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings in which:

DETAILED DESCRIPTION OF THE INVENTION

Figure 1:
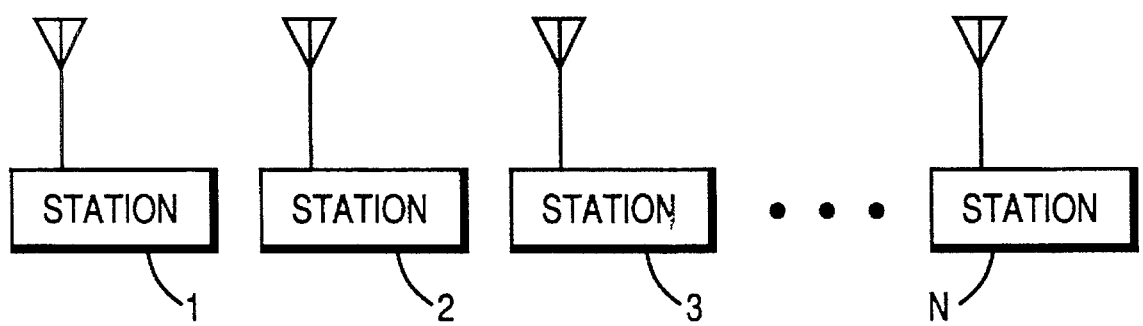
FIG. 1 is a block diagram of a conventional radio LAN computer system.
Figure 2:
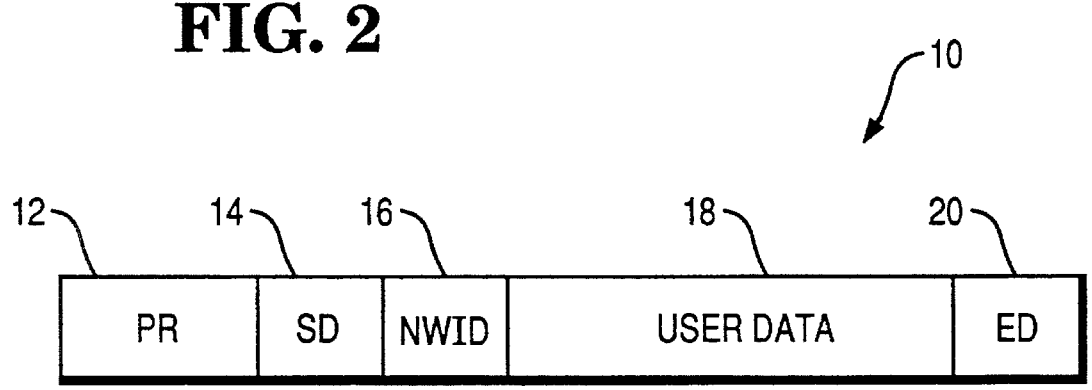
FIG. 2 is a representation of the frame format employed in a conventional radio LAN computer system.
Figure 3:
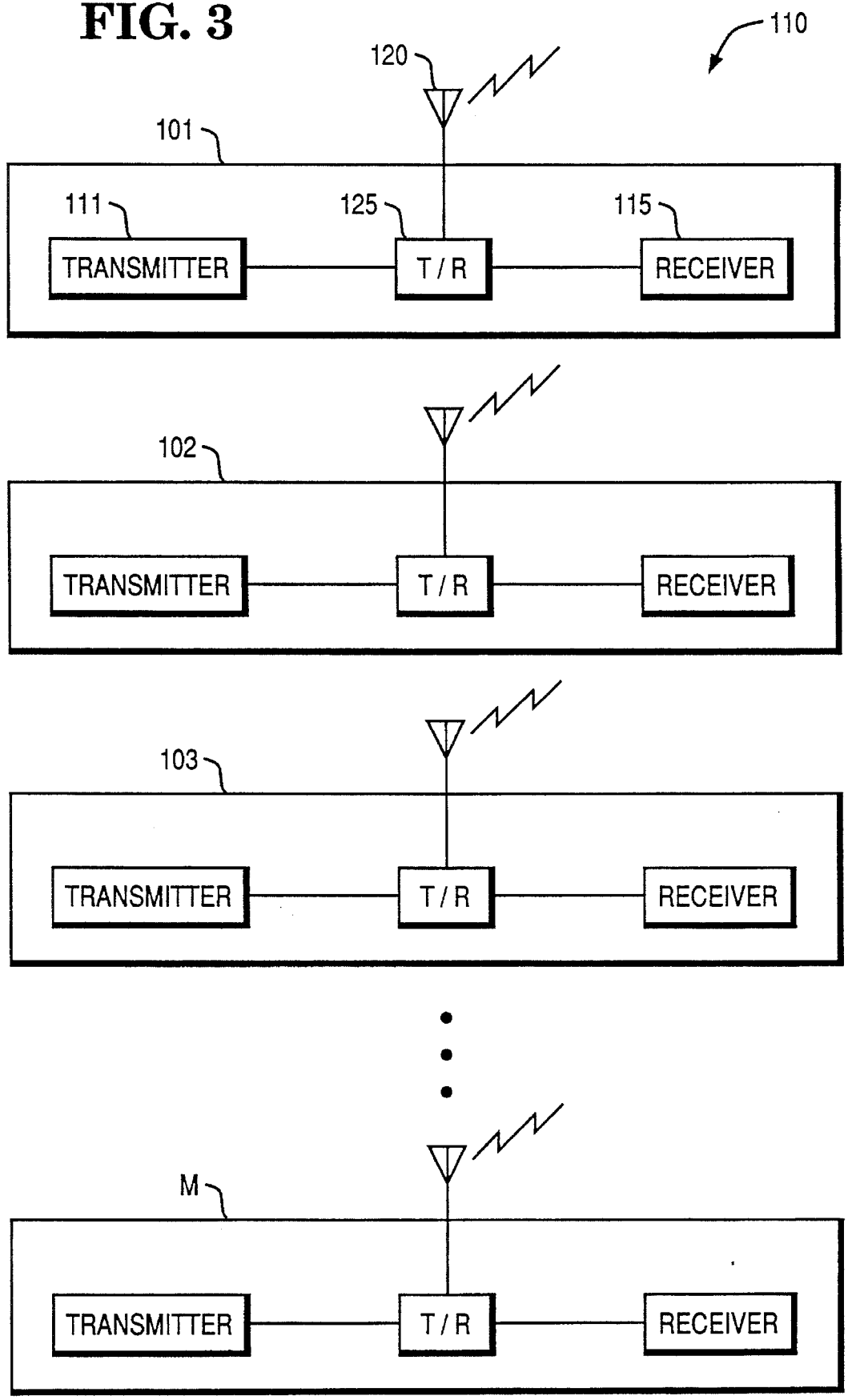
FIG. 3 is a block diagram of a plurality of radio LAN transceiver stations coupled together by a radio link in accordance with the present invention.

FIG. 3 shows a block diagram of a plurality of transceivers or stations designated 101, 102, 103 ... M and coupled together by a radio link to form a local area network (LAN)

110. By way of example, station 101 includes a transmitter 111 capable of spread spectrum transmission and a receiver 115 capable of spread spectrum reception. Those skilled in the art will appreciate that other modes of transmission and reception, such as frequency shift keying, phase shift keying and frequency modulation, for example, may be employed as well. Transmitter 111 and receiver 115 are coupled to an antenna 120 by a conventional transmit receive (T/R) circuit 125 to permit the transmitter and receiver to share the same antenna. Stations 102, 103 . . . M are substantially identical to station 101.

In actual practice, station 101 includes an input device such as a keyboard (not shown) and an output device such as a display (not shown) as well as other optional input/ output peripheral devices typically associated with a LAN station. In this particular embodiment of the invention, stations 101, 102, 103 . . . M employ spread spectrum technology to communicate with one another. In an indoor embodiment of the invention, the stations typically transmit and receive on a channel in the 902–928 MHz band although the frequency bands at about 2.4 and 5.8 GHz may also be employed. These frequency bands are given by way of example and represent governmental regulatory frequency restrictions rather than any technical restriction or limitation of the invention.

Figure 4:
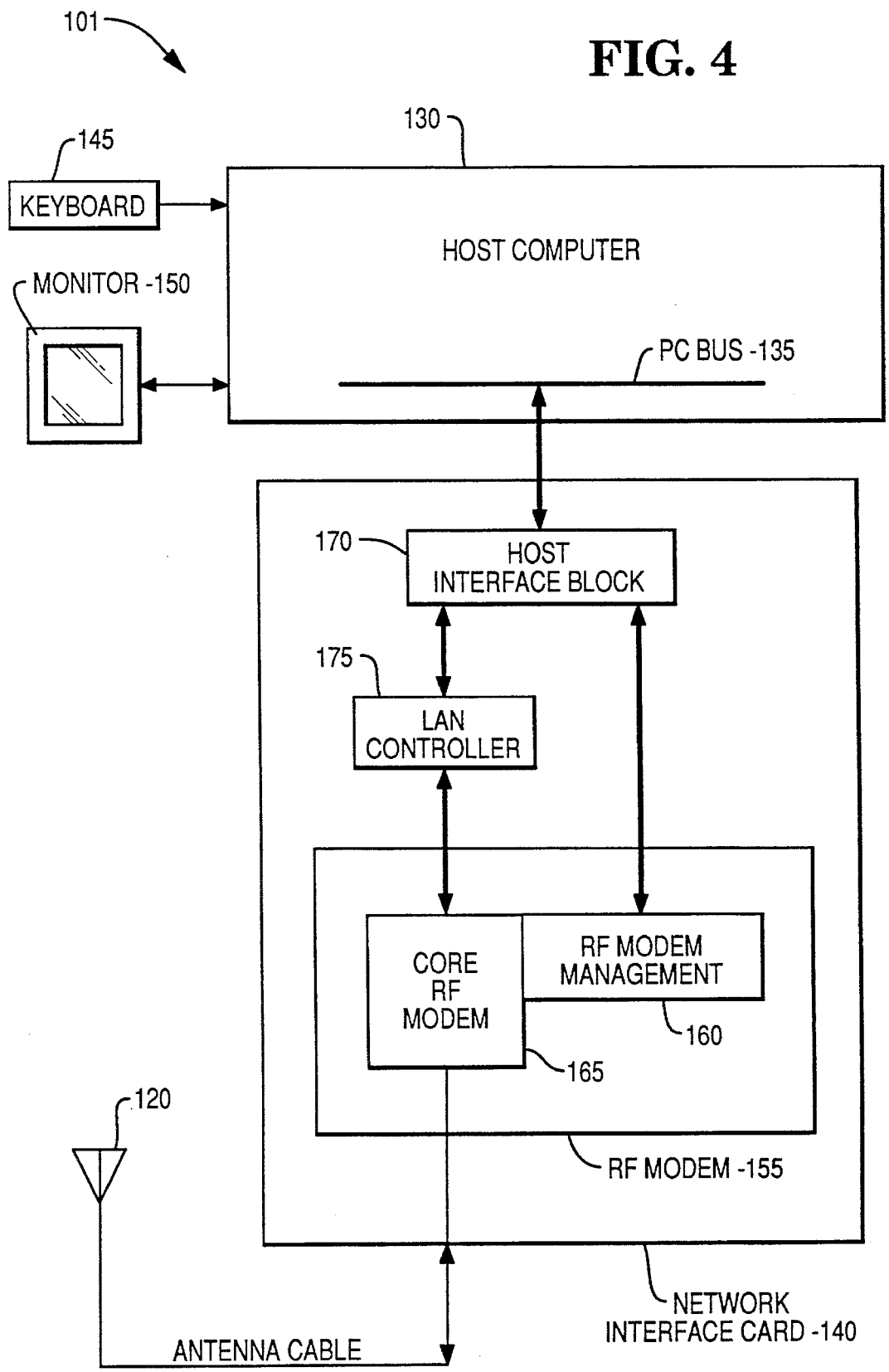
FIG. 4 is a block diagram of a host LAN station in accordance with the present invention.

FIG. 4 is a more detailed block diagram of a particular network station 101. For discussion purposes, station 101 is defined to be the host station and the remaining stations 102, 103, . . . M are defined to be remote stations, although in actual practice, all of these stations are functionally similar. Host station 101 includes a computer 130 having an expansion bus 135 into which various adapter cards may be plugged. A network interface card 140 is plugged into expansion bus 135 as shown in FIG. 4. A keyboard 145 is coupled to computer 130 to enable the user to input information into computer 130. A display 150 is coupled to computer 130 to enable the computer to display information to a user. Antenna 120 is coupled to network interface card 140 as shown to enable transmission and reception of messaging information between host station 101 and a remote station.

Figure 5A:
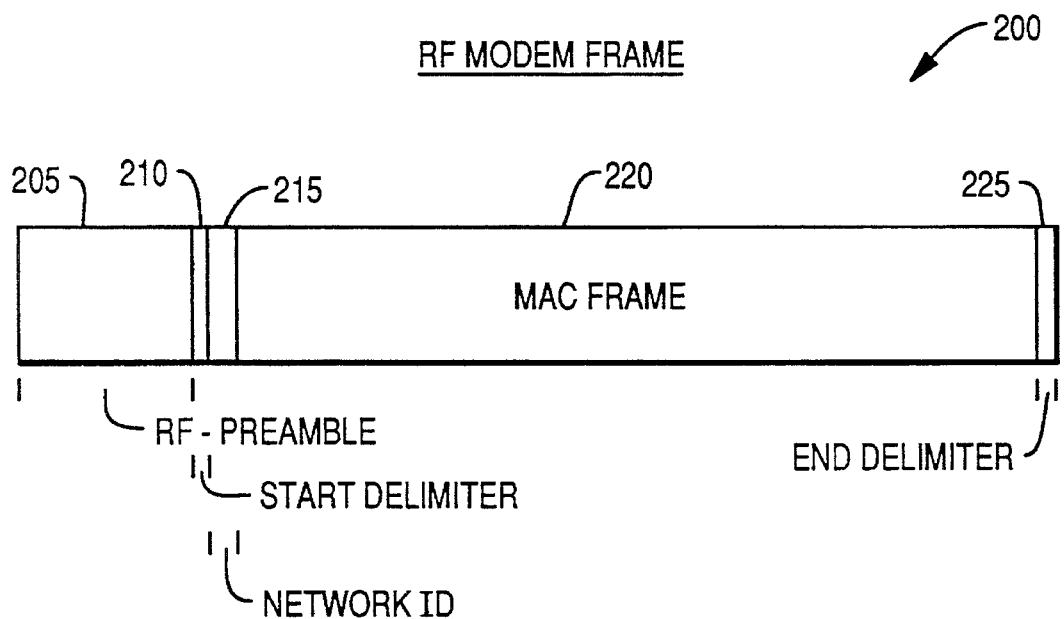
FIG. 5A is a representation of a typical frame transmitted by the host station.

Network interface card 140 includes an RF modem 155 which transmits information signals from computer 130 in the frame format shown later in FIGS. 5A and 5B. The frames are modulated onto an RF signal by RF modem 155 and are supplied to antenna 120 for communication to remote stations. RF modem 155 also receives frames from remote stations and demodulates such frames to enable further processing of these frames. RF modem 155 includes a modem management block 160 and core RF modem 165. Block 160 controls propagation of NWID code and assembly of diagnostic information. Core RF modem 165 converts frame data in accordance with medium access control (MAC) protocol into radio signals and radio signals to frame data.

Network interface card 140 includes a host interface block 170 which interfaces computer 130 with RF modem 155. Host interface block 170 couples computer bus 135 to modem management block 160 as shown in FIG. 4. Network interface card 140 also includes a LAN controller 175, for example the Intel 82586 LAN controller, to control LAN operations (frame handling and medium access control) in the conventional manner.

The stations within the LAN, including both the host and remote stations, communicate with each other by transmitting and receiving information frames over the above described radio link. More specifically, the format of a typical RF modem frame 200 transmitted and received by RF modem 155 is shown in detail in FIG. 5A. RF modem frame 200 includes an RF preamble 205, a start delimiter 210, a network identification designator (NWID) code 215 followed by a media access control (MAC) frame 220 and ending with an end delimiter 225 to denote the end of the modem frame.

Figure 5B:
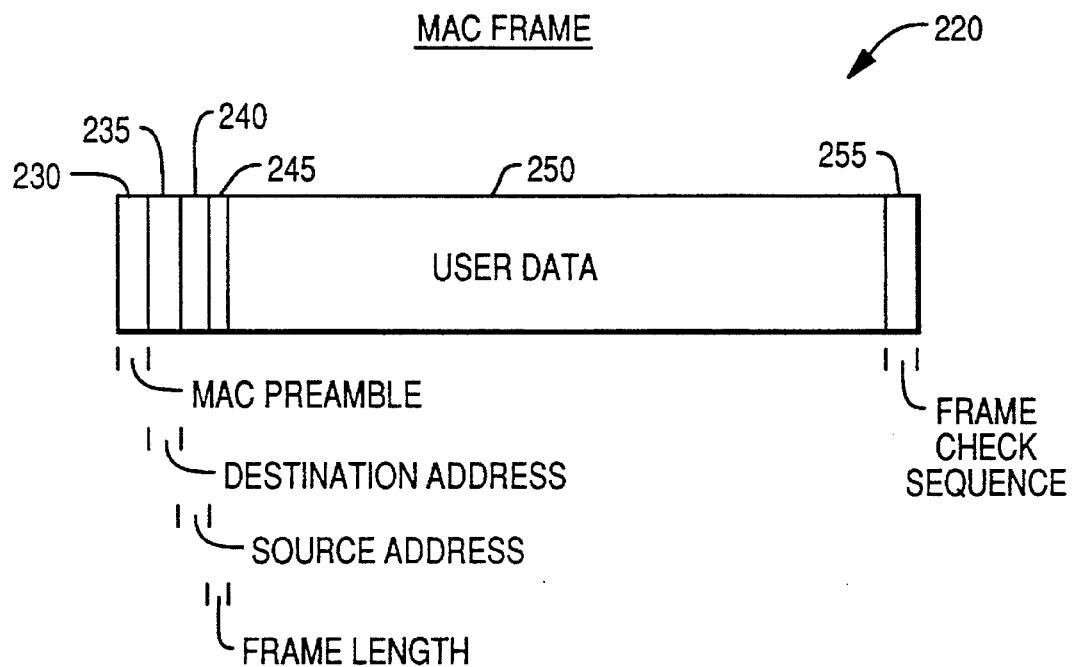
FIG. 5B is a representation of the MAC (medium access control) frame portion of the frame of FIG. 5A.

A standard MAC frame is depicted in FIG. 5B as MAC frame 220. MAC frame 220 includes a MAC preamble 230 followed by a destination address 235 and a source address 240. The destination address 235 is the address of the particular remote station for which this particular frame is intended. If a broadcast of the particular frame to all remote stations is intended, then a broadcast destination address (for example, FFFFFFFFFFFF) is used as the destination address. The source address 240 is the address of the host station or other station which is transmitting this particular frame. The source address 240 is followed by the frame length 245 in MAC frame 220 such that the destination remote station is notified of the length of the frame. The frame length 245 is followed by user data 250 and an end delimiter 255.

All LAN communications, i.e., regular, non-diagnostic and diagnostic frames, are through a path including LAN controller 175 of FIG. 4. That is, regular non-diagnostic LAN communications are through the path including computer 130, host interface block 170, LAN controller 175 and core RF modem 165. However, the special diagnostic LAN communications, e.g., retrieval of link quality information, are through a path including computer 135, host interface block 170 and modem management block 160. The present invention employs diagnostic NWID codes which will now be explained in more detail.

When point-to-point diagnostics are to be conducted, a point-to-point diagnostics mode is activated on the stations intended to participate in the diagnostic activity. More particularly, to engage in such diagnostic activity, host station 101 repetitively transmits diagnostic frames exhibiting the frame format depicted in FIGS. 5A and 5B except including a diagnostic NWID code in place of NWID code 215. A diagnostic NWID code is one of several NWID codes which have been reserved for diagnostics activities. Thus, such diagnostic NWID codes are readily distinguishable from the regular NWID codes used for regular LAN transmissions. Diagnostic NWID codes are not to be used in the frames of regular LAN transmissions. Once activated into the diagnostic mode by an appropriate command, host station 101 after a predetermined interval transmits a diagnostic frame including the diagnostic NWID code and then listens to diagnostic transmissions from other remote stations. Host station 101 searches for those diagnostic frame transmissions from other remote stations which exhibit the same NWID code as host station 101. The other remote stations which have been activated into the diagnostics mode are also transmitting diagnostic frames. Host station 101 listens for these frames.

For as long as a station in the point-to-point diagnostic mode fails to recognize another station with the same diagnostic NWID code, that station continues to broadcast a broadcast MAC address using a destination address such as FFFFFFFFFFFF as described earlier. For example, host station 101 will continue to transmit diagnostic frames and listen between such frames until a remote station with the same diagnostic NWID code is recognized. After a first station has recognized another station using the same diagnostic NWID code, the first station will use the recognized MAC source address of the other station as the destination address in the next diagnostic frame transmitted by the first station. For example, when host station 101 listens to a diagnostic frame from a particular remote station and recognizes that the diagnostic NWID code of that remote diagnostic frame is the same as the diagnostic NWID code of the host station, then the host station uses the MAC source address of that remote diagnostic frame as the destination address in the next diagnostic frame transmitted by the host station. In this manner, a point-to-point diagnostic link is established between the host station and the particular remote station.

For each received diagnostic frame exhibiting the same diagnostic NWID code as host station 101, host station 101 derives and stores link quality information with respect to the integrity of the radio communications link between host station 101 and the particular remote station. After each received diagnostic frame with the same diagnostic NWID code, this information on reception conditions is read out of memory and is transmitted to the remote station as user data in the next diagnostic frame transmitted by the host station. In this manner, the link quality information becomes available to the stations on both ends of the point-to-point link.

Figure 6:
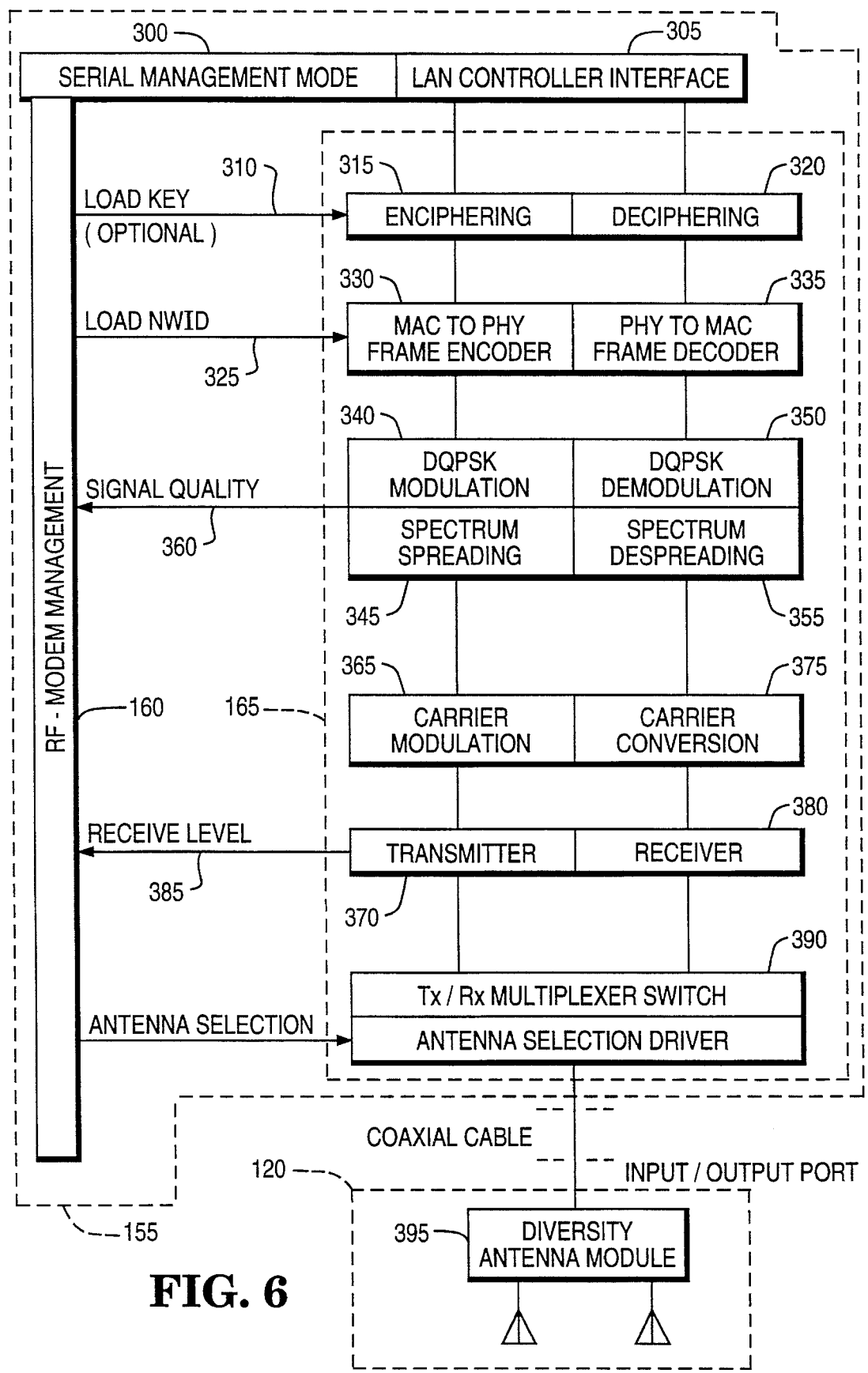
FIG. 6 is a functional block diagram of the RF modem employed in the host LAN station of FIG. 4.

The gathering of link quality information is now described in more detail. RF modem management block 160 gathers information with respect to receive conditions for diagnostic frames which contain the same diagnostic NWID code as that programmed into RF modem management block 160. When a first station receives diagnostic frames from another station which exhibit the same diagnostic NWID code as the first station, then such diagnostic frames are designated as being equal NWID frames. During reception of such equal NWID frames, host station 101 gathers the following information with respect to the diagnostic frame received from the remote station, namely, link quality and selected antenna (if more than one antenna is employed as antenna 120 in a space diversity antenna arrangement, such as is shown in FIG. 6).

RF modem management block 160 also determines the receive signal level after reception of an equal NWID code diagnostic frame during the interframe space between diagnostic frames. This receive signal level is recognized as a noise level for later use in determination of the signal-to-noise ratio achieved over the point-to-point link.

As described earlier, RF modem management block 160 determines those diagnostic frames from another station which exhibit a diagnostic NWID code which is equal to the diagnostic NWID code of a receiving station and can likewise determine those diagnostic frames which exhibit an NWID code which is non-equal to the diagnostic NWID code of the receiving station. RF modem management block 160 counts the number of received equal NWID frames and counts the number of received non-equal NWID frames. The number of received equal NWID frames and the number of received non-equal NWID frames are stored individually in respective first and second registers (not shown) in RF modem 155.

All of the above discussed measured results are stored in registers (not shown) in RF modem 155. Host computer 130 reads out such stored signal quality information including the measured levels and the numbers of counted equal and non-equal NWID frames via host interface block 170. In this manner, host computer 130 is apprised of signal quality information with respect to the integrity of the point-to-point link between the host station and another remote station. The diagnostic information thus provided to host computer 130 includes receive level, path attenuation, signal to noise ratio and signal quality as affected by delay spread distortion and other interference.

For completeness, a detailed functional block diagram of RF modem 155 is shown in FIG. 6 and is now discussed. RF modem 155 employs a serial management mode as indicated at 300. In this serial management mode, a number of different functions now described may be serially implemented. The serial management mode is implemented in conjunction with a LAN controller interface indicated at 305. Serial management mode 300 and LAN controller interface 305 control communication between elements RF management block 160 and core RF modem 165, and elements host interface block 170 and LAN controller 175, shown in FIG. 4.

An encryption key is entered or loaded into RF modem 155 at 310 to permit enciphering of the user data in diagnostic frames as indicated at block 315 and to permit deciphering of the same as indicated at block 320.

The selected NWID code, whether it be a regular NWID code or a diagnostic NWID code is loaded into RF modem 155 at 325. This action permits operation of the MAC to PHY frame encoder 330 and PHY to MAC frame decoder 335, where PHY represents the physical structure of a modem frame such as modem frame 200 shown in FIG. 5A. Frame encoder 330 encodes diagnostic frames with the desired information in the various fields thereof. Frame decoder 335 decodes diagnostic frames and derives the contents of the various fields thereof.

The encoded frames from encoder 330 are modulated by a differential quadrature phase shift keying (DPQSK) modulator as indicated at 340. The resultant modulated signals are then transmitted via spread spectrum technology as indicated at 345 although other radio transmission technology can be employed as well.

The decoded frames from frame decoder 335 are demodulated by a differential quadrature phase shift keying (DQPSK) demodulator as indicated at 350. The resultant demodulated signals are then unspread via spread spectrum technology as indicated at 355. The signal quality of the resultant demodulated signal is monitored by RF modem 155 as indicated at 360.

The encoded frame signal which is subjected to spectrum spreading at 345 is carrier modulated at 365 and is then transmitted by the RF transmitter of modem 155 at 370. The decoded frame signals which are subjected to spectrum despreading at 355 are carrier converted or down-converted to base-band at 375. The resultant base band signal is then processed by a receiver in modem 155 to recover the contents of the received frame as indicated at 380. Receive level information as to both the receive level during a received frame as well as the received level during the interframe space is provided to RF modem management block 160 as indicated at 385.

The transmitter 370 and receiver 380 are coupled to a conventional transmit/receive multiplex switch 390. A diversity antenna module 395 is coupled between two spaced apart antennas and switch 390 to connect switch 390 to a particular antenna which is receiving a superior signal at a particular point in time. RF modem management block 160 is provided with antenna selection information as to which particular antenna is selected by diversity antennas module 395 at a particular point in time.

While a radio LAN station and radio local area network have been disclosed above, it will be appreciated that a method of operation of such stations and network have also been disclosed. In summary, a method for collecting diagnostic information with respect to the quality of communications between a host station and a remote station in a radio local area network is provided. The method includes the step of broadcasting a diagnostic frame by the host station, the diagnostic frame including a destination address, a host source address and a diagnostic network identification (NWID) code. The method further includes the step of transmitting a diagnostic frame by the remote station. The method also includes the step of receiving, by the host station, of a diagnostic frame from the remote station thus producing a received diagnostic frame. The method still further includes the step of determining, by the host station, if a particular received diagnostic frame exhibits the same diagnostic NWID code as the diagnostic NWID code of the host station. The method also includes the step of monitoring, by the host station, of signal quality characteristics of those diagnostic frames from the remote station that exhibit the same diagnostic NWID code as the host station.

Another embodiment of the method of the invention is disclosed wherein diagnostic information is collected with respect to the quality of communications between a host station and a remote station in a radio local area network. In this alternative embodiment, the method includes the step of activating a point to point diagnostics mode on the host station and the remote station. The method also includes the step of broadcasting, by the host station, of a diagnostic frame including a broadcast destination address, a host source address and a diagnostic network identification (NWID) code. The method further includes the step of transmitting, by the remote station, of a diagnostic frame including a broadcast destination address, a remote source address and a diagnostic NWID code. The method also includes the step of receiving, by the host station, of diagnostic frame transmissions from the remote station thus producing received diagnostic frames. The method still further includes the step of determining, by the host station, if a particular received diagnostic frame exhibits the same unique diagnostic NWID code as the host station. The method also includes the step of counting, by the host station, of the number of received frames which exhibit the same unique NWID code as the host station thus producing an equal NWID count. The method also includes the step of counting, by the host station, of the number of received frames which do not exhibit the same unique NWID code as the host station thus producing a non-equal NWID count. The method also includes the step of storing the equal and non-equal NWID counts in respective registers. The method further includes the step of monitoring, by the host station, of link quality characteristics of those received diagnostic frames exhibiting a diagnostic NWID code equal to the diagnostic NWID code of the host station. The method still further includes the step of storing, by the host station, of reception quality data indicative of the link quality characteristics. The method also includes the step of transmitting, by the host station, of a responsive diagnostic frame including the reception quality data and using the source address of a received diagnostic frame as the destination address of the responsive diagnostic frame if in the determining step the received diagnostic frame exhibits the same unique diagnostic NWID code as the host station.

The foregoing describes a wireless radio LAN apparatus and method of operation thereof which are capable of collecting diagnostics information to enable assessment of the quality of the radio communications link between one radio LAN station and other radio LAN stations. The disclosed apparatus and method is compatible with existing LAN controllers and MAC addressing.

While only certain preferred features of the invention have been shown by way of illustration, many modifications and changes will occur to those skilled in the art. It is, therefore, to be understood that the present claims are intended to cover all such modifications and changes which fall within the true spirit of the invention.

What is claimed is:

1. A radio local area network host station comprising:

transmitting means for transmitting diagnostic frames including a diagnostic network identification designator (NWID) code via a radio link to remote stations which are remote from said host station;

receiving means for receiving diagnostic frames via said radio link from said remote stations;

determining means, coupled to said receiving means, for determining if any of the frames received from said remote stations exhibit the same diagnostic NWID code as said host station; and monitoring means, coupled to said receiving means, for monitoring those frames received from a particular remote station which are determined by said determining means to exhibit the same diagnostic NWID code as the diagnostic frames transmitted by said host station, said monitoring means thus deriving signal quality characteristics for those frames received from said particular remote station and link quality information with respect to the radio link between said particular remote station and said host station.

2. The local area network station of claim 1 further comprising first counting means for counting the number of frames received from said remote stations which exhibit an NWID code which is the same as the NWID code of said host station thus producing an equal NWID count.

3. The local area network station of claim 1 further comprising second counting means for counting the number of frames received from said remote stations which exhibit an NWID code which is not the same as the NWID code of said host station thus producing a non-equal NWID count.

4. The local area network station of claim 2 further comprising a first memory for storing said equal NWID count.

5. The local area network station of claim 3 further comprising a second memory for storing said non-equal NWID count.

6. The local area network station of claim 1 further comprising a memory for storing said link quality information.

7. The local area network station of claim 1 further comprising means for transmitting said link quality information to said particular remote station.

8. A local area network including a plurality of stations communicating over a wireless radio transmission channel, said network comprising:

a plurality of remote stations which transmit diagnostic frames including diagnostic network identification (NWID) codes;

a host station which transmits diagnostic frames including a diagnostic NWID code via a radio link to said plurality of remote stations and which receives diagnostic frames transmitted by said remote stations via said radio link, said host station including:

determining means for determining if any of the diagnostic frames received from said remote station exhibit the same diagnostic NWID code as said host station; and monitoring means for monitoring those frames received from a particular remote station which are determined by said determining means to exhibit the same diagnostic NWID code as the diagnostic frames transmitted by said host station, said monitoring means thus deriving signal quality characteristics for those frames received from said particular remote station and link quality information with respect to the radio link between said particular remote station and said host station.

9. The local area network of claim 8 wherein said host station further comprises first counting means for counting the number of diagnostic frames received from said remote stations which exhibit a diagnostic NWID code which is the same as the diagnostic NWID code of said host station thus producing an equal NWID count.

10. The local area network of claim 8 wherein said host station further comprises second counting means for counting the number of frames received from said remote stations which exhibit a NWID code which is not the same as the NWID code of said host station thus producing a non-equal NWID count.

11. The local area network of claim 9 wherein said host station further comprises a first memory for storing said equal NWID count.

12. The local area network of claim 10 wherein said host station further comprises a second memory for storing said non-equal NWID count.

13. The local area network of claim 8 wherein said host station further comprises a memory for storing said link quality information.

14. The local area network of claim 8 wherein said host station further comprises means for transmitting said link quality information to said particular remote station.

15. A local area network including a plurality of stations communicating over a wireless radio transmission channel, said network comprising:

a host station having a host source address associated therewith;

a plurality of remote stations each having a remote source address associated therewith;

said host station including host broadcast means for transmitting a broadcast diagnostic frame including a broadcast destination address, said host source address and a diagnostic NWID code to said plurality of remote stations;

said remote stations each including remote receiving means for receiving diagnostic frames and remote transmitting means for transmitting diagnostic frames;

said host station further including host receiving means for receiving diagnostic frames from said remote stations thus producing host received diagnostic frames;

said host station further including determining means for determining if a particular host received diagnostic frame exhibits the same diagnostic NWID code as the diagnostic NWID code of said host station; and said host station further including monitoring means for monitoring the signal quality characteristics of those host received diagnostic frames from said remote station that exhibit the same diagnostic NWID code as said host station.

16. The local area network of claim 15 wherein said host station includes a memory for storing reception quality data indicative of said signal quality characteristics.

17. The local area network of claim 16 wherein said host station further comprises means for transmitting a responsive diagnostic frame including said reception quality data to a remote station when said host station determines that the diagnostic NWID code of said remote station is the same as the diagnostic NWID code of said host station.

18. A method for collecting diagnostic information with respect to the quality of communications between a host station and a remote station in a radio local area network, said method comprising the steps of:

broadcasting, by said host station, a diagnostic frame, said diagnostic frame including a destination address, a host source address and a diagnostic network identification (NWID) code;

transmitting, by said remote station, a diagnostic frame;

receiving, by said host station, a diagnostic frame from said remote station thus producing a received diagnostic frame;

determining, by said host station, if a particular received diagnostic frame exhibits the same diagnostic NWID code as the diagnostic NWID code of said host station; and monitoring, by said host station, of signal quality characteristics of those diagnostic frames from said remote station that exhibit the same diagnostic NWID code as said host station.

19. The method of claim 18 further comprising the step of transmitting, by said host station to said remote station, a diagnostic frame including reception quality data indicative of said signal quality characteristics if in said determining step said received diagnostic frame exhibits the same diagnostic NWID code as said host station.

20. The method of claim 19 wherein the source address of said received diagnostic frame is used as the destination address of the diagnostic frame transmitted in the step of claim 19.

21. The method of claim 18 further comprising the step of counting, by said host station, of the number of received frames which exhibit the same NWID code as said host station, thus producing an equal NWID count.

22. The method of claim 18 further comprising the step of counting, by said host station, of the number of received frames which exhibit the same NWID code as said host station, thus producing a non-equal NWID count.

23. A method for collecting diagnostic information with respect to the quality of communications between a host station and a remote station in a radio local area network, said method comprising the steps of:

broadcasting, by said host station, of a diagnostic frame including a broadcast destination address, a host source address and a diagnostic network identification (NWID) code;

transmitting, by said remote station, of a diagnostic frame including a broadcast destination address, a remote source address and a diagnostic NWID code;

receiving, by said host station, of diagnostic frame transmissions from said remote station thus producing received diagnostic frames:

determining, by said host station, if a particular received diagnostic frame exhibits the same diagnostic NWID code as said host station;

monitoring, by said host station, of signal quality characteristics of those received diagnostic frames exhibiting a diagnostic NWID code equal to the diagnostic NWID code of said host station;

storing, by said host station, of reception quality data indicative of said signal quality characteristics; and transmitting, by said host station, of a responsive diagnostic frame including said reception quality data and using the source address of said received diagnostic frame as the destination address of said responsive diagnostic frame if in said determining step said received diagnostic frame exhibits the same unique diagnostic NWID code as said host station.

24. A method for collecting diagnostic information with respect to the quality of communications between a host station and a remote station in a radio local area network, said method comprising the steps of:

activating a point to point diagnostics mode on said host station and said remote station;

broadcasting, by said host station, of a diagnostic frame including a broadcast destination address, a host source address and a first diagnostic network identification (NWID) code;

transmitting, by said remote station, of a diagnostic frame including a broadcast destination address, a remote source address and a diagnostic NWID code;

receiving, by said host station, of diagnostic frame transmissions from said remote station thus producing received diagnostic frames;

determining, by said host station, if a particular received diagnostic frame includes a diagnostic NWID code equivalent to said first diagnostic NWID code;

counting, by said host station, received frames which exhibit the same NWID code as said host station thus producing an equal NWID count;

counting, by said host station, of received frames which do not exhibit the same NWID code as said host station thus producing a non-equal NWID count;

storing said equal and non-equal NWID counts in respective registers;

monitoring, by said host station, of signal quality characteristics of those received diagnostic frames exhibiting a diagnostic NWID code equal to the diagnostic NWID code of said host station;

storing, by said host station, of reception quality data indicative of said signal quality characteristics; and transmitting, by said host station, of a responsive diagnostic frame including said reception quality data and using the remote source address of a received diagnostic frame as the broadcast destination address of said responsive diagnostic frame if said received diagnostic frame includes a diagnostic NWID code equivalent to said first diagnostic NWID code.

* * * * *